(12) United States Patent
Kim

(10) Patent No.: US 11,085,345 B2
(45) Date of Patent: Aug. 10, 2021

(54) CONTROL METHOD OF EXHAUST GAS PURIFICATION SYSTEM FOR VEHICLE

(71) Applicants: HYUNDAI MOTOR COMPANY, Seoul (KR); KIA MOTORS CORPORATION, Seoul (KR)

(72) Inventor: Minjae Kim, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/824,051

(22) Filed: Mar. 19, 2020

(65) Prior Publication Data

US 2021/0148266 A1 May 20, 2021

(30) Foreign Application Priority Data

Nov. 14, 2019 (KR) .................. 10-2019-0146066

(51) Int. Cl.
*F01N 3/20* (2006.01)
*F01N 3/035* (2006.01)

(52) U.S. Cl.
CPC .............. *F01N 3/208* (2013.01); *F01N 3/035* (2013.01); *F01N 2570/14* (2013.01); *F01N 2610/02* (2013.01)

(58) Field of Classification Search
CPC . B01D 53/9418; B01D 53/9495; F01N 11/00; F01N 11/002; F01N 11/007; F01N 2550/02; F01N 2560/06; F01N 2610/02; F01N 2610/04; F01N 2900/1602; F01N 3/2066; F01N 3/208; Y02T 10/12; Y02T 10/24; Y02T 10/40; Y02T 10/47
See application file for complete search history.

(56) References Cited

U.S. PATENT DOCUMENTS

2007/0044457 A1* 3/2007 Upadhyay ............... F01N 3/208
 60/295
2018/0230879 A1* 8/2018 Saitoh .................... F01N 11/00

FOREIGN PATENT DOCUMENTS

JP 2015197086 * 11/2015

OTHER PUBLICATIONS

JP-2015197086, Nov. 2015, Furui et al., machine translation.*

* cited by examiner

*Primary Examiner* — Phutthiwat Wongwian
*Assistant Examiner* — Diem T Tran
(74) *Attorney, Agent, or Firm* — Brinks Gilson & Lione

(57) ABSTRACT

A control method of an exhaust gas purification system for a vehicle may include: determining, by an injection controller, whether a selective catalyst reduction (SCR) is actuated; determining, by the injection controller, whether a temperature of the SCR is within a set diagnosis region; deciding, by the injection controller, a normal pattern of the SCR corresponding to the temperature of the SCR; comparing, by the injection controller, the decided normal pattern of the SCR with a current performance pattern of the SCR; determining, by the injection controller, whether a current performance pattern of the SCR is an abnormal pattern; and performing, by the injection controller, a correction control based on a current abnormal pattern of the SCR.

15 Claims, 7 Drawing Sheets

FIG. 5

| Region A | Region B | Region C | Diagnosis result |
|---|---|---|---|
| η₁ Normal pattern = η₂ Abnormal pattern | η₁ Normal pattern = η₂ Abnormal pattern | η₁ Normal pattern = η₂ Abnormal pattern | Normal pattern |
| η₁ Normal pattern > η₂ Abnormal pattern | η₁ Normal pattern = η₂ Abnormal pattern | η₁ Normal pattern < η₂ Abnormal pattern | ⟨Pattern 1⟩ Movement to left side |
| η₁ Normal pattern < η₂ Abnormal pattern | η₁ Normal pattern = η₂ Abnormal pattern | η₁ Normal pattern < η₂ Abnormal pattern | ⟨Pattern 2⟩ Movement to right side |
| η₁ Normal pattern < η₂ Abnormal pattern | η₁ Normal pattern = η₂ Abnormal pattern | η₁ Normal pattern < η₂ Abnormal pattern | ⟨Pattern 3⟩ Horizontal narrowing |
| η₁ Normal pattern > η₂ Abnormal pattern | η₁ Normal pattern = η₂ Abnormal pattern | η₁ Normal pattern > η₂ Abnormal pattern | ⟨Pattern 4⟩ Horizontal widening |
| η₁ Normal pattern = η₂ Abnormal pattern | η₁ Normal pattern = η₂ Abnormal pattern | η₁ Normal pattern < η₂ Abnormal pattern | ⟨Pattern 5⟩ Movement of only right side to left side |
| η₁ Normal pattern = η₂ Abnormal pattern | η₁ Normal pattern = η₂ Abnormal pattern | η₁ Normal pattern > η₂ Abnormal pattern | ⟨Pattern 6⟩ Movement of only right side to right side |
| η₁ Normal pattern > η₂ Abnormal pattern | η₁ Normal pattern = η₂ Abnormal pattern | η₁ Normal pattern = η₂ Abnormal pattern | ⟨Pattern 7⟩ Movement of only left side to left side |
| η₁ Normal pattern < η₂ Abnormal pattern | η₁ Normal pattern = η₂ Abnormal pattern | η₁ Normal pattern = η₂ Abnormal pattern | ⟨Pattern 8⟩ Movement of only left side to right side |
| η₁ Normal pattern < η₂ Abnormal pattern | η₁ Normal pattern < η₂ Abnormal pattern | η₁ Normal pattern < η₂ Abnormal pattern | ⟨Pattern 9⟩ Upward movement |

FIG. 6

| Diagnosis result | Region A | Region B | Region C |
|---|---|---|---|
| Normal pattern | 0 | 0 | 0 |
| ⟨Pattern 1⟩ Movement to left side | + | 0 | − |
| ⟨Pattern 2⟩ Movement to right side | − | 0 | + |
| ⟨Pattern 3⟩ Horizontal narrowing | − | 0 | − |
| ⟨Pattern 4⟩ Horizontal widening | + | 0 | + |
| ⟨Pattern 5⟩ Movement of only right side to left side | 0 | 0 | − |
| ⟨Pattern 6⟩ Movement of only right side to right side | 0 | 0 | + |
| ⟨Pattern 7⟩ Movement of only left side to left side | + | 0 | 0 |
| ⟨Pattern 8⟩ Movement of only left side to right side | − | 0 | 0 |
| ⟨Pattern 9⟩ Upward movement | − | − | − |

0 : Reducing agent is maintained
+ : Reducing agent increases
− : Reducing agent decreases

CONTROL METHOD OF EXHAUST GAS PURIFICATION SYSTEM FOR VEHICLE

CROSS-REFERENCE TO RELATED APPLICATION

This application claims priority to and the benefit of Korean Patent Application No. 10-2019-0146066, filed on Nov. 14, 2019, the entire contents of which are incorporated herein by reference.

FIELD

The present disclosure relates to a control method of an exhaust gas purification system for a vehicle.

BACKGROUND

The statements in this section merely provide background information related to the present disclosure and may not constitute prior art.

In general, an exhaust system of an engine includes exhaust gas postprocessing apparatuses including Diesel Oxidation Catalyst (DOC), Diesel Particulate matter Filter (DPF), Selective Catalyst Reduction (SCR), Lean NOx Trap (LNT), and the like in order to reduce carbon monoxide (CO), hydrocarbon (HC), particulate matter (NOx), nitride oxide (NOx), etc., as pollutant contained in exhaust gas.

DOC oxidizes total hydrocarbons and carbon monoxide in the exhaust gas and oxidizes nitrogen monoxide to nitrogen dioxide, DPF collects particulate matters contained in the exhaust gas and purifies the particulate matters through a chemical conversion process, and LNT occludes the nitride oxide contained in the exhaust gas and reacts the nitride oxide with a reducing agent and removes the nitride oxide reacted with the reducing agent under a set condition.

Among them, SCR as an apparatus for purifying nitride oxide serves to convert a reducing agent (urea) injected in a stream direction of the exhaust gas through an injector into ammonia ($NH_3$) by heat of the exhaust gas and reduce nitride oxide into nitrogen gas ($N_2$) and water ($H_2O$) as a catalytic reaction of nitride oxide and ammonia in the exhaust gas by an SCR catalyst.

In the conventional SCR, an appropriate amount of the reducing agent (element) is determined by an exhaust gas flow, a NOx concentration, and target purification efficiency. Here, the catalyst has a predetermined performance pattern and those skilled in the art may predict maximum purification efficiency under a condition of the exhaust gas flow and the NOx concentration changed by analyzing the pattern and thus attempt controlling a fixed quantity of reducing agents according to the condition to be supplied to the catalyst.

However, we have discovered that when the purification efficiency is wrongly predicted or the performance pattern of the catalyst is irregularly changed, as the fixed quantity of reducing agents are not supplied, the performance of the purification system may deteriorate or a failure may occur. In other words, the irregular change of the performance pattern of the catalyst may cause a result that the performance of the purification system deviates from a prerequisite expectation value by a manufacturing tolerance, a quality state of a raw material, a difference in degree of high-temperature degradation, etc.

We have found that when there is the difference in purification efficiency according to the irregular change of the performance pattern of the catalyst, a serious problem such as NOx purification efficiency deterioration or $NH_3$ slip may be caused, and as a result, a separate apparatus for accurate diagnosis of a state may be required. For example, an apparatus capable of measuring $NH_3$ may be additionally provided, but this may be accompanied by an excessive cost increase.

The above information disclosed in this Background section is only for enhancement of understanding of the background of the present disclosure and therefore it may contain information that does not form the prior art that is already known to a person of ordinary skill in the art.

SUMMARY

The present disclosure provides a control method of an exhaust gas purification system for a vehicle, which is capable of continuously maintaining optimum purification efficiency by correcting an injection amount of a reducing agent.

A control method of an exhaust gas purification system for a vehicle according to an exemplary form of the present disclosure for achieving the object may be a control method of an exhaust gas purification system for a vehicle, which is configured to include SCR, a reducing agent injector injecting a reducing agent for actuating the SCR, a NOx sensor measuring nitride oxide after actuation of the SCR, a temperature sensor sensing a temperature of the SCR, and an injection controller controlling actuation of the reducing agent injector according to information received from the NOx sensor and the temperature sensor.

An exemplary form of the present disclosure provides a control method of an exhaust gas purification system for a vehicle. The control method may include: determining, by an injection controller, whether the SCR is actuated; determining, by the injection controller, whether a temperature of the SCR is within a set diagnosis region; determining, by the injection controller, a normal pattern of the SCR corresponding to the temperature of the SCR; comparing, by the injection controller, the determined normal pattern of the SCR with a current performance pattern of the SCR; determining, by the injection controller, whether the current performance pattern of the SCR; and performing, by the injection controller, a correction control based on a current abnormal pattern of the SCR.

In some forms of the present disclosure, the control method may start when an engine of the vehicle is turned on and end when the engine is turned off.

When it is determined that the SCR is not actuated, it may be repeatedly determined that the SCR is actuated.

In some forms of the present disclosure, in determining whether the temperature of the SCR is within the set diagnosis region, the injection controller determines based on the temperature of the SCR received from the temperature sensor when the SCR is being actuated.

In some forms of the present disclosure, when it is determined that the temperature of the SCR is not within the set diagnosis region, it may be repeatedly determined whether the temperature of the SCR is within the set diagnosis region.

The set diagnosis region based on the temperature of the SCR may be set to a region where the temperature of the SCR is from 200° C. to 350° C.

In some forms of the present disclosure, determining the normal pattern of the SCR corresponding to the temperature of the SCR may be performed when the SCR is actuated and the temperature of the SCR is within the set diagnosis region.

In comparing the determined normal pattern of the SCR with the current performance pattern of the SCR, an output value of the NOx sensor of the normal pattern of the SCR is compared with a current output value received from the NOx sensor, based on the same $NH_3$ occlusion amount.

In some forms of the present disclosure, the current performance pattern of the SCR may include: a first region A where the current output value of the NOx sensor gradually decreases as the $NH_3$ occlusion amount increases, a second region B where the current output value of the NOx sensor is zero (0) while the $NH_3$ occlusion amount is greater than the $NH_3$ occlusion amount of the first region A, and a third region C where the current output value of the NOx sensor gradually increases as the $NH_3$ occlusion amount increases while the $NH_3$ occlusion amount is greater than the $NH_3$ occlusion amount of the second region B.

According to the same $NH_3$ occlusion amount, when the $NH_3$ occlusion amount is in the first region A of the normal pattern of the SCR, the current output value of the NOx sensor and the first region A of the normal pattern of the SCR may be compared with each other, when the $NH_3$ occlusion amount is in the second region B of the normal pattern of the SCR, the current output value of the NOx sensor and the second region B of the normal pattern of the SCR may be compared with each other, and when the $NH_3$ occlusion amount is in the third region C of the normal pattern of the SCR, the current output value of the NOx sensor and the third region C of the normal pattern of the SCR may be compared with each other Information of the output value of the NOx sensor based on each normal pattern corresponding to the temperature of the SCR and the $NH_3$ occlusion amount corresponding to each normal pattern as a map may be stored in the injection controller in advance.

In some forms of the present disclosure, the abnormal pattern of the SCR may include nine abnormal patterns based on graphs showing a current output value of the NOx sensor based on a $NH_3$ occlusion amount, where the graphs depict the $NH_3$ occlusion amount on a horizontal axis of the graph and the current output value of the NOx sensor on a vertical axis of the graph. When the graph indicative of the abnormal pattern of the SCR is compared with the graph of the normal pattern of the SCR, the graphs of the nine abnormal patterns show at least one of: a movement to a left side, a movement to a right side, horizontally narrow, horizontally wide, a movement of only the right side to the left side, a movement of only the right side to the right side, a movement of only the left side to the left side, a movement of only the left side to the right side, or an upward movement.

In some forms of the present disclosure, determining whether the current performance pattern of the SCR is the abnormal pattern include: determining whether the current performance pattern of the SCR is one of the nine abnormal patterns of the SCR, and when the performance pattern is one of the nine abnormal patterns, determining a corresponding abnormal pattern among the nine abnormal patterns.

In some forms of the present disclosure, determining the corresponding abnormal pattern is performed based on the current performance pattern of the SCR which is diagnosed by comparing the output value of the NOx sensor of the normal pattern of the SCR and the current output value of the NOx sensor of the current performance pattern of the SCR.

In some forms of the present disclosure, when the corresponding abnormal pattern of the SCR is determined, performing the correction control based on the corresponding abnormal pattern.

When the performance pattern of the SCR does not correspond to one of the nine abnormal patterns of the SCR, the control method may return to determining whether the temperature of the SCR is within the set diagnosis region.

In performing the correction control based on the current abnormal pattern of the SCR, the injection controller may control the reducing agent injector so that the injection amount of the reducing agent increases in a section in which the output value of the NOx sensor is less than the normal pattern, the injection amount of the reducing agent is maintained in a section in which the output value of the NOx sensor is the same as the normal pattern, and the injection amount of the reducing agent is reduced in a section in which the output value of the NOx sensor is greater than the normal pattern.

When it is determined that the current performance pattern of the SCR is not the abnormal pattern, the control method may return to the determining of whether the temperature of the SCR is within the set diagnosis region.

According to an exemplary form of the present disclosure, even in the case of an irregular change of a performance pattern of a catalyst, by using a conventional NOx sensor mounted on a rear end of SCR, as an additional apparatus for accurate diagnosis is not required, performance can be enhanced while reducing the cost.

Further, the diagnosis using the conventional NOx sensor is possible by classifying abnormal patterns of SCR into nine types using cross-sensitivity characteristics and a reducing agent injection amount is corrected according to a diagnosis result, thereby maintaining an optimum state for purifying exhaust gas.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a table of comparing output values of an NOx sensor in A, B, and C regions for each of nine abnormal patterns of SCR according to an exemplary form of the present disclosure;

FIG. 6 is a table showing correction of a reducing agent for each of nine abnormal patterns of SCR according to an exemplary form of the present disclosure.

Figure 1:
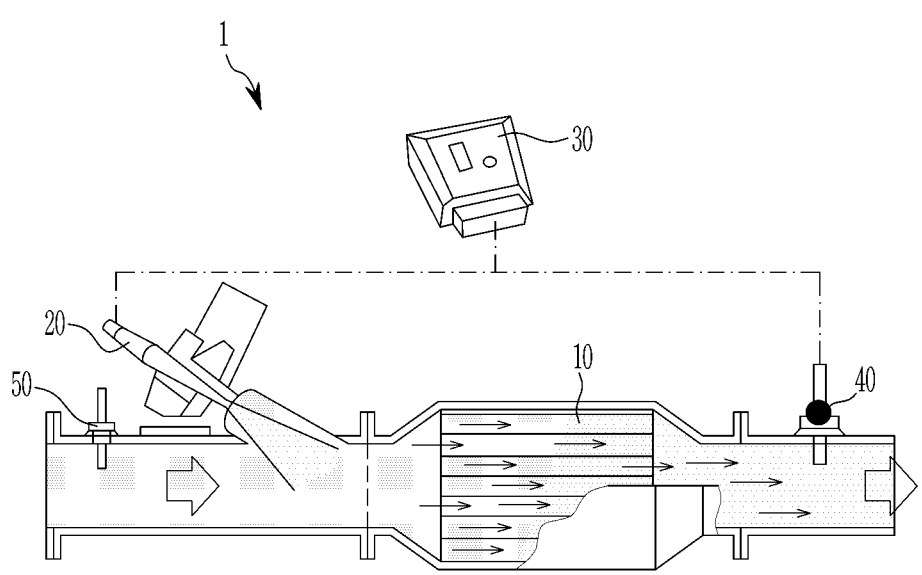
FIG. 1 is a schematic diagram of an exhaust gas purification system for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An exemplary form of the present disclosure will hereinafter be described in detail with reference to the accompanying drawings.

FIG. 1 is a schematic diagram of an exhaust gas purification system for a vehicle according to an exemplary form of the present disclosure.

As illustrated in FIG. 1, the exhaust gas purification system 1 for a vehicle according to the exemplary form of the present disclosure is provided to apply a selective catalyst reduction (SCR) postprocessing system to an engine and includes an SCR 10, a reducing agent injector 20 injecting urea from a front end of the SCR 10, an injection controller (dosing control unit (DCU)) 30 actuating the reducing agent injector 20 and controlling a quantity of urea (reducing agent) injected from the reducing agent injector 20, and a NOx sensor 40 measuring nitride oxide (NOx) at a rear end of the SCR 10. Here, an appropriate quantity of urea may be determined by an exhaust gas flow, a NOx concentration, and target purification efficiency as in a conventional SCR and the injection controller 30 may collect information on an amount (an output value of the NOx sensor) of nitride oxide (NOx) measured by the NOx sensor 40 from the NOx sensor 40. Further, the exhaust gas purification system 1 of a vehicle according to the exemplary form of the present disclosure may further include a temperature sensor 50 and it is illustrated that the temperature sensor 50 which is used for identifying the temperature of the SCR 10 is provided on the front end of the reducing agent injector 20, but the present disclosure is not limited thereto.

A control method for the exhaust gas purification system for the vehicle according to the exemplary form of the present disclosure for continuously maintaining optimum purification efficiency by controlling the exhaust gas purification system 1 of the vehicle according to the exemplary form of the present disclosure performs, by the injection controller 30, processes including checking whether SCR operates, determining whether a diagnosis is possible, diagnosing an abnormal pattern, determining whether the pattern is abnormal by comparing with a normal pattern, correcting a reducing agent, and the like and detailed contents will be described below.

Figure 2:
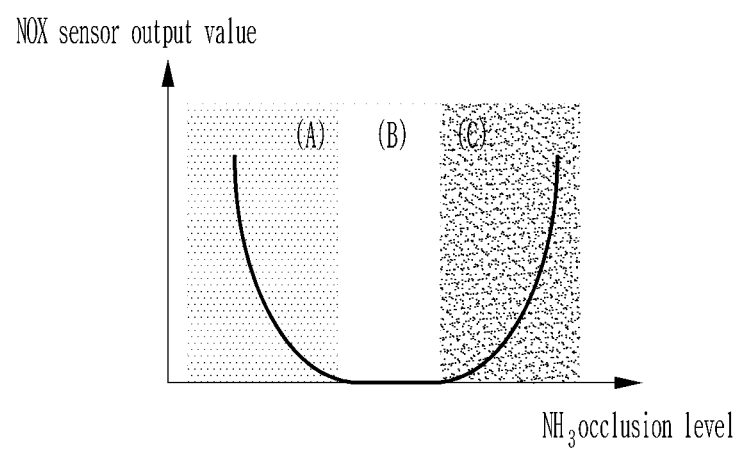
FIG. 2 is a graph showing a normal pattern which becomes a determination criterion of nine abnormal patterns of SCR in a control method of an exhaust gas purification system for a vehicle according to an exemplary form of the present disclosure.

FIG. 2 is a graph showing a normal pattern which becomes a determination criterion of nine abnormal patterns of SCR in a control method of an exhaust gas purification system for a vehicle according to an exemplary form of the present disclosure.

As shown in FIG. 2, showing an output value of a NOx sensor depending on occlusion of normal $NH_3$ by the graph becomes the normal pattern. Here, the output value of the NOx sensor is an amount of nitride oxide (NOx) measured by the NOx sensor 40.

The normal pattern of the SCR 10 may include: a first region A which is a section in which as an occlusion amount of $NH_3$ increases, NOx is reduced and the output value of the NOx sensor gradually decreases, a second region B which is a section in which NOx purification efficiency of SCR becomes the maximum and the output value of the NOx sensor becomes zero "0", and a third region C which is a section in which the output value of the NOx sensor gradually increases as the occlusion amount of $NH_3$ increases by the cross-sensitivity characteristics of the NOx sensor as a section in which an occlusion level of $NH_3$ exceeds an occlusion amount of SCR and $NH_3$ slip occurs. Further, the $NH_3$ occlusion amount of region A is smaller than that of region B and the $NH_3$ occlusion amount of region B is smaller than that of region C. The normal pattern of the SCR 10 may depend on the temperature. In other words, since the performance of the SCR 10 depends on the temperature in a normal category, there are different normal patterns which become a determination criterion of nine abnormal patterns of the SCR 10 for each temperature range.

Figure 3:
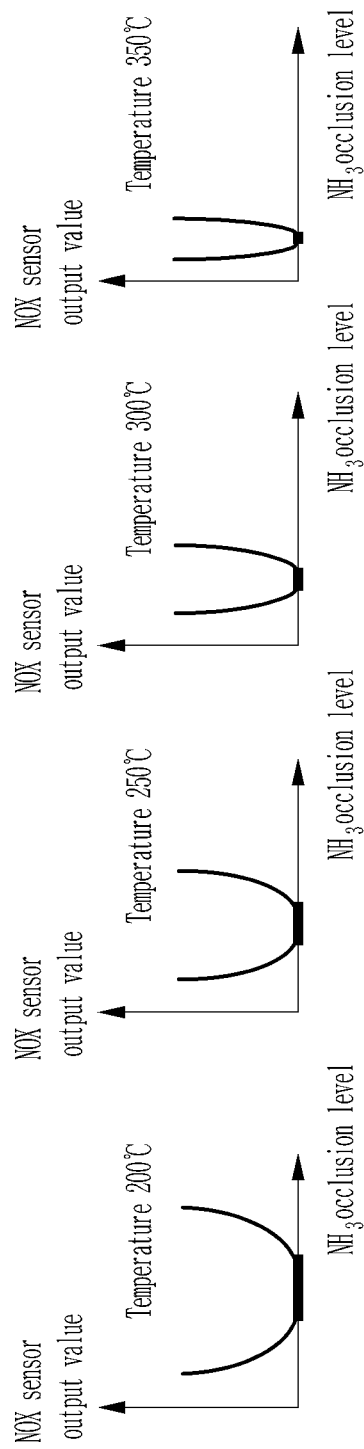
FIG. 3 illustrates graphs visibly showing a change depending on a temperature of a normal pattern which becomes a determination criterion of nine abnormal patterns of SCR in a control method of an exhaust gas purification system for a vehicle according to an exemplary form of the present disclosure.

FIG. 3 illustrates schematic graphs visibly showing a change depending on a temperature of a normal pattern which becomes a determination criterion of nine abnormal patterns of SCR in a control method of an exhaust gas purification system for a vehicle according to an exemplary form of the present disclosure.

As shown in FIG. 3, as the normal pattern of the SCR 10 is high in temperature, an interval between left and right sides becomes narrowed and a part (region B, a section of maximum purification efficiency) where the output value of the NOx sensor is smallest moves to the left side. Meanwhile, in the control method of the exhaust gas purification system for the vehicle according to the exemplary form of the present disclosure, when the temperature is too low or high and the temperature thus deviates from a set range, the abnormal pattern may not be diagnosed.

Figure 4:
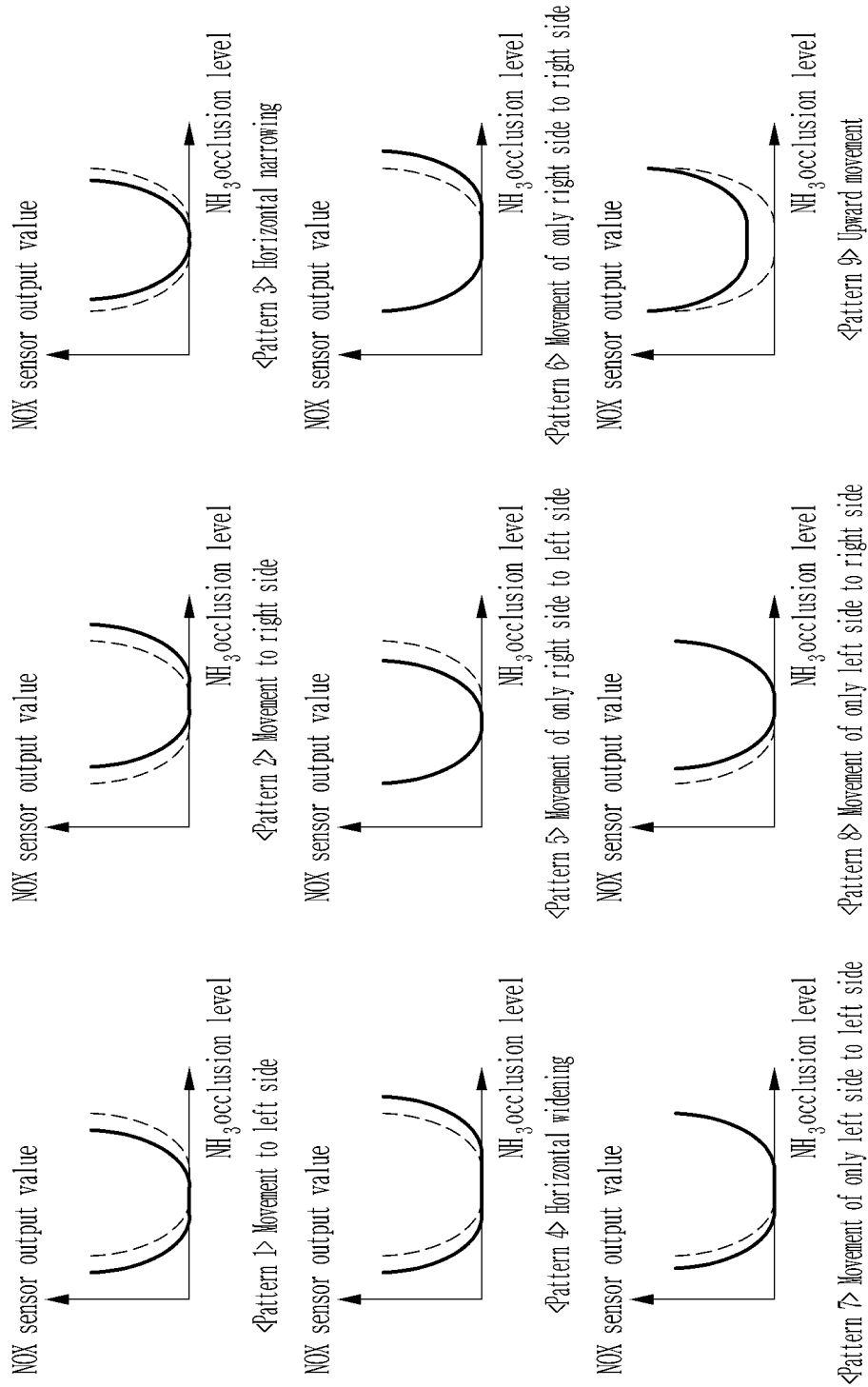
FIG. 4 illustrates graphs visibly showing nine abnormal patterns of SCR in a control method of an exhaust gas purification system for a vehicle according to an exemplary form of the present disclosure.

FIG. 4 illustrates schematic graphs visibly showing nine abnormal patterns of SCR in a control method of an exhaust gas purification system for a vehicle according to an exemplary form of the present disclosure and FIG. 5 is a table of comparing output values of an NOx sensor in A, B, and C regions for each of nine abnormal patterns of SCR according to an exemplary form of the present disclosure.

As shown in FIGS. 4 and 5, the abnormal pattern of the SCR 10 when compared with the normal pattern of the SCR under one temperature condition may include nine abnormal patterns based on graphs showing a current output value of the NOx sensor based on a $NH_3$ occlusion amount, where the graphs depict the $NH_3$ occlusion amount on a horizontal axis of the graph and the current output value of the NOx sensor on a vertical axis of the graph. When the graph indicative of the abnormal pattern of the SCR is compared with the graph of the normal pattern of the SCR, the graphs of the nine abnormal patterns may show the following patterns: a movement to the left side, a movement to the right side, horizontally narrowing, horizontally widening, a movement of only the right side to the left side, a movement of only the right side to the right side, a movement of only the left side to the left side, a movement of only the left side to the right side, and an upward movement. Further, the output values of the NOx sensor are compared with the normal pattern in regions A, B, and C to diagnose the abnormal pattern of the SCR 10 as one of the nine cases.

FIG. 6 is a table showing correction of a reducing agent for each of the nine abnormal patterns of SCR according to an exemplary form of the present disclosure.

As shown in FIG. 6, the injection controller 30 controls the reducing agent injector 20 so that the injection amount of the reducing agent increases in a section in which the output value of the NOx sensor is small by comparison with the normal pattern, the injection amount of the reducing agent is maintained in a section in which the output value of the NOx sensor is the same by comparison with the normal pattern, and the injection amount of the reducing agent is reduced in a section in which the output value of the NOx sensor is large by comparison with the normal pattern. For example, in the case of abnormal pattern 1 moved to the left side by comparison with the normal pattern, the injection amount of the reducing agent is controlled to increase in region A, the injection amount of the reducing agent is controlled to be maintained in region B, and the injection amount of the reducing agent is controlled to be reduced in region C (see FIGS. 4 and 5).

Hereinafter, a logic for the contents will be described below with reference to FIG. 7.

Figure 7:
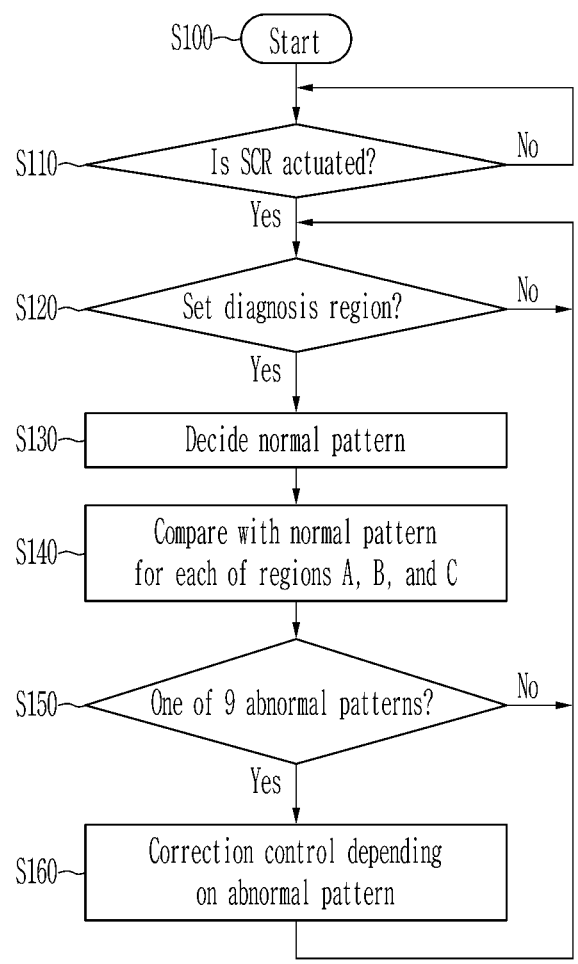
FIG. 7 is a flowchart of a control method of an exhaust gas purification system for a vehicle according to an exemplary form of the present disclosure.

FIG. 7 is a flowchart of a control method of an exhaust gas purification system for a vehicle according to an exemplary form of the present disclosure.

As shown in FIG. 7, the control method of the exhaust gas purification system for the vehicle may be started together with start ON (i.e., turn-on) of the engine (S100). Meanwhile, the control method of the exhaust gas purification system for the vehicle may be ended together with start OFF (turn-off) of the engine.

When the control method of the exhaust gas purification system for the vehicle starts (S100), the injection controller 30 determines whether the SCR 10 is actuated (S110). Here, when it is determined that the SCR 10 is not actuated, a step (S110) in which the logic is not performed and it is determined whether the SCR 10 is actuated is repeatedly performed.

When it is determined that the SCR 10 is being actuated, the injection controller 30 receives the information on the temperature from the temperature sensor 50 to determine whether the temperature of the SCR 10 is within a set range, i.e., a set diagnosis region (S120). Here, when it is determined that the temperature of the SCR 10 is not within the set diagnosis region, a step (S120) in which the logic is not performed and it is determined whether the temperature of the SCR 10 is within the set diagnosis region is repeatedly performed. In the diagnosis region set in the exemplary form of the present disclosure, the temperature of the SCR 10 may be set to 200 to 350° C. (see FIG. 3).

When it is determined that the temperature of the SCR 10 is within the set diagnosis region, the injection controller 30 determines the normal pattern of the SCR 10, which corresponds to the temperature of the SCR 10 (S130). As described above, there are different normal patterns which become determination criteria of nine abnormal patterns of the SCR 10 for each temperature range and one of the normal patterns is determined in a step (S130) of determining the normal pattern of the SCR 10 (see FIG. 3).

When the normal pattern of the SCR 10 is determined based on the temperature information (i.e., the temperature of the SCR 10), the injection controller 30 compares the output value of the NOx sensor of the current performance pattern of the SCR 10 received from the NOx sensor 40 and the output value of the NOx sensor of the normal pattern of the SCR 10 (S140). In this case, when a current $NH_3$ occlusion amount is in region A of the normal pattern of the SCR 10, the output value of the NOx sensor of the current performance pattern of the SCR 10 and region A of the normal pattern of the SCR 10 are compared with each other and when the current $NH_3$ occlusion amount is in region B of the normal pattern of the SCR 10, the output value of the NOx sensor of the current performance pattern of the SCR 10 and region B of the normal pattern of the SCR 10 are compared with each other, and when the current $NH_3$ occlusion amount is in region C of the normal pattern of the SCR 10, the output value of the NOx sensor of the current performance pattern of the SCR 10 and region C of the normal pattern of the SCR 10 are compared with each other (S140). Meanwhile, information of an output value of the NOx sensor depending on each normal pattern depending on the temperature and the $NH_3$ occlusion amount corresponding to each normal pattern as a map obtained through repeated experiments may be stored in the injection controller 30 in advance.

When the current performance pattern of the SCR 10 is diagnosed by comparing the output value of the NOx sensor of the normal pattern of the SCR 10 and the output value of the NOx sensor of the current performance pattern of the SCR 10, the injection controller 30 determines whether the current performance pattern of the SCR 10 is one of nine abnormal patterns of the SCR 10. When the performance pattern is one of the nine abnormal patterns, the injection controller 30 determines a corresponding abnormal pattern (S150).

When it is determined that the current performance pattern of the SCR 10 is one of the nine abnormal patterns of the SCR 10, the injection controller 30 performs corresponding correction control according to which abnormal patterns of nine abnormal patterns of the SCR 10 the diagnosed performance pattern of the SCR 10 is (S160). In other words, as described above, the injection controller 30 controls the reducing agent injector 20 so that the injection amount of the reducing agent increases in a section in which the output value of the NOx sensor is small by comparison with the normal pattern, the injection amount of the reducing agent is maintained in a section in which the output value of the NOx sensor is the same by comparison with the normal pattern, and the injection amount of the reducing agent is reduced in a section in which the output value of the NOx sensor is large by comparison with the normal pattern (see FIG. 6). Meanwhile, when it is determined that the current performance pattern of the SCR 10 does not correspond to one of nine abnormal patterns of the SCR 10, it is regarded that the current performance pattern of the SCR 10 is normal and the control method of the exhaust gas purification system for the vehicle according to the exemplary form of the present disclosure returns to the step (S120) of determining whether the temperature of the SCR 10 is within the set diagnosis region.

As described above, according to an exemplary form of the present disclosure, even in the case of an irregular change of a performance pattern of a catalyst, by using a conventional NOx sensor 40 mounted on a rear end of SCR 10, as an additional apparatus for accurate diagnosis is not required, performance can be enhanced while reducing or minimizing the cost. Further, the diagnosis using the conventional NOx sensor 40 is possible by classifying abnormal patterns of SCR 10 into nine types using cross-sensitivity characteristics and a reducing agent injection amount is corrected according to a diagnosis result, thereby maintaining an optimum state for purifying exhaust gas.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A control method of an exhaust gas purification system for a vehicle, where the exhaust gas purification system includes a selective catalyst reduction (SCR), a reducing agent injector injecting a reducing agent for actuating the SCR, a nitride oxide (NOx) sensor measuring nitride oxide after actuation of the SCR, a temperature sensor sensing a temperature of the SCR, and an injection controller controlling actuation of the reducing agent injector based on information received from the NOx sensor and the temperature sensor, the control method comprising:
   determining, by an injection controller, whether the SCR is actuated;
   determining, by the injection controller, whether a temperature of the SCR is within a set diagnosis region;
   determining, by the injection controller, a normal pattern of of the SCR corresponding to the temperature of the SCR;
   comparing, by the injection controller, the determined normal pattern of the SCR with a current performance pattern of the SCR;
   determining, by the injection controller, whether the current performance pattern of the SCR is an abnormal pattern; and
   performing, by the injection controller, a correction control based on a current abnormal pattern of the SCR, wherein:
   the abnormal pattern of the SCR compared with the normal pattern of the SCR comprises nine abnormal patterns based on graphs showing a current output value of the NOx sensor based on a $NH_3$ occlusion amount, where the graphs depict the $NH_3$ occlusion amount on a horizontal axis of the graph and the current output value of the NOx sensor on a vertical axis of the graph,
   when the graph indicative of the abnormal pattern of the SCR is compared with the graph of the normal pattern of the SCR, the graphs of the nine abnormal patterns show at least one of: a movement to a left side, a movement to a right side, horizontally narrow, horizontally wide, a movement of only the right side to the left side, a movement of only the right side to the right side, a movement of only the left side to the left side, a movement of only the left side to the right side, or an upward movement, and
   determining whether the current performance pattern of the SCR is the abnormal pattern includes: determining whether the current performance pattern of the SCR is one of the nine abnormal patterns of the SCR, and when the current performance pattern of the SCR is one of the nine abnormal patterns, determining a corresponding abnormal pattern among the nine abnormal patterns.

2. The control method of claim 1, wherein:
the control method starts when an engine of the vehicle is turned on and ends when the engine is turned off.

3. The control method of claim 1, wherein:
when the SCR is not actuated, repeatedly determining whether the SCR is actuated.

4. The control method of claim 1, wherein:
in determining whether the temperature of the SCR is within the set diagnosis region, the injection controller determines based on the temperature of the SCR received from the temperature sensor when the SCR is being actuated.

5. The control method of claim 4, wherein:
when the temperature of the SCR is not within the set diagnosis region, repeatedly determining whether the temperature of the SCR is within the set diagnosis region.

6. The control method of claim 1, wherein:
the set diagnosis region based on the temperature of the SCR is set to a region where the temperature of the SCR is from 200° C. to 350° C.

7. The control method of claim 1, wherein:
determining the normal pattern of the SCR corresponding to the temperature of the SCR is performed when the SCR is actuated and the temperature of the SCR is within the set diagnosis region.

8. The control method of claim 1, wherein:
in comparing the determined normal pattern of the SCR with the current performance pattern of the SCR, an output value of the NOx sensor of the normal pattern of the SCR is compared with the current output value received from the NOx sensor, based on the same $NH_3$ occlusion amount.

9. The control method of claim 8, wherein:
the current performance pattern of the SCR includes: a first region where the current output value of the NOx sensor gradually decreases as the $NH_3$ occlusion amount increases, a second region where the current output value of the NOx sensor is zero (0) while the $NH_3$ occlusion amount is greater than the $NH_3$ occlusion amount of the first region, and a third region where the current output value of the NOx sensor gradually increases as the $NH_3$ occlusion amount increases while the $NH_3$ occlusion amount is greater than the $NH_3$ occlusion amount of the second region, and
according to the same $NH_3$ occlusion amount, when the $NH_3$ occlusion amount is in the first region of the normal pattern of the SCR, the current output value of the NOx sensor and the first region of the normal pattern of the SCR are compared with each other, when the $NH_3$ occlusion amount is in the second region of the normal pattern of the SCR, the current output value of the NOx sensor and the second region of the normal pattern of the SCR are compared with each other, and when the $NH_3$ occlusion amount is in the third region of the normal pattern of the SCR, the current output value of the NOx sensor and the third region of the normal pattern of the SCR are compared with each other.

10. The control method of claim 8, wherein:
information of the output value of the NOx sensor based on each normal pattern corresponding to the temperature of the SCR and the $NH_3$ occlusion amount corresponding to each normal pattern is stored in the injection controller.

11. The control method of claim 1, wherein:
determining the corresponding abnormal pattern is performed based on the current performance pattern of the SCR which is diagnosed by comparing the output value of the NOx sensor of the normal pattern of the SCR and the current output value of the NOx sensor of the current performance pattern of the SCR.

12. The control method of claim 1, wherein:
when the corresponding abnormal pattern of the SCR is determined, performing the correction control based on the corresponding abnormal pattern.
13. The control method of claim 1, wherein:
when the performance pattern of the SCR does not correspond to one of the nine abnormal patterns of the SCR, the control method returns to determining whether the temperature of the SCR is within the set diagnosis region.
14. The control method of claim 1, wherein:
in performing the correction control based on the current abnormal pattern of the SCR, the injection controller controls the reducing agent injector such that the injection amount of the reducing agent increases in a section in which an output value of the NOx sensor is less than the normal pattern, the injection amount of the reducing agent is maintained in a section in which the output value of the NOx sensor is the same as the normal pattern, and the injection amount of the reducing agent is reduced in a section in which the output value of the NOx sensor is greater than the normal pattern.
15. The control method of claim 1, wherein:
when the current performance pattern of the SCR is not the abnormal pattern, the control method returns to determining whether the temperature of the SCR is within the set diagnosis region.

* * * * *